(12) United States Patent
Gurgov et al.

(10) Patent No.: US 12,699,236 B2
(45) Date of Patent: Aug. 4, 2026

(54) OPTICAL DEVICES, SYSTEMS, AND METHODS FOR WAVEGUIDE ALIGNMENT

(71) Applicant: Mellanox Technologies, Ltd., Yokneam (IL)

(72) Inventors: Hassid C. Gurgov, Binyamina (IL); Liron Gantz, Haifa (IL); Thomas Hastings Greer, III, Chapel Hill, NC (US)

(73) Assignee: Mellanox Technologies, Ltd., Yokneam (IL)

( * ) Notice: Subject to any disclaimer, the term of this patent is extended or adjusted under 35 U.S.C. 154(b) by 329 days.

(21) Appl. No.: 18/372,750

(22) Filed: Sep. 26, 2023

(65) Prior Publication Data

US 2025/0102743 A1     Mar. 27, 2025

(51) Int. Cl.
*G02B 6/42* (2006.01)
*G01M 11/00* (2006.01)

(52) U.S. Cl.
CPC .......... *G02B 6/4222* (2013.01); *G01M 11/31* (2013.01)

(58) Field of Classification Search
CPC .............................. G02B 6/4222; G01M 11/31
See application file for complete search history.

(56) References Cited

U.S. PATENT DOCUMENTS

2016/0202432 A1* 7/2016 Chen .................... G02B 6/4227
385/14

FOREIGN PATENT DOCUMENTS

CN         112904501 A  *  6/2021  ........... G02B 6/4225

OTHER PUBLICATIONS

English translation of CN112904501A (Year: 2021).*
Gurgov et al., Pending U.S. Appl. No. 18/371,485, filed Sep. 22, 2023.

* cited by examiner

*Primary Examiner* — Sung H Pak
(74) *Attorney, Agent, or Firm* — Schwegman Lundberg & Woessner, P.A.

(57) ABSTRACT

Apparatuses, systems, and methods are provided for waveguide alignment. An example optical module includes a substrate, one or more primary waveguides supported by the substrate, and an optoelectronic component supported by the substrate and in optical communication with the one or more primary waveguides. The optoelectronic component uses optical signals having a first wavelength. The optical module further includes a signal reflection component configured to selectively reflect optical signals having a second wavelength so as to determine an alignment of the one or more primary waveguides. In some instances the one or more primary waveguides define the signal reflection component(s). In other instances, one or more secondary waveguides are supported by the substrate and define the signal reflection component(s).

20 Claims, 14 Drawing Sheets

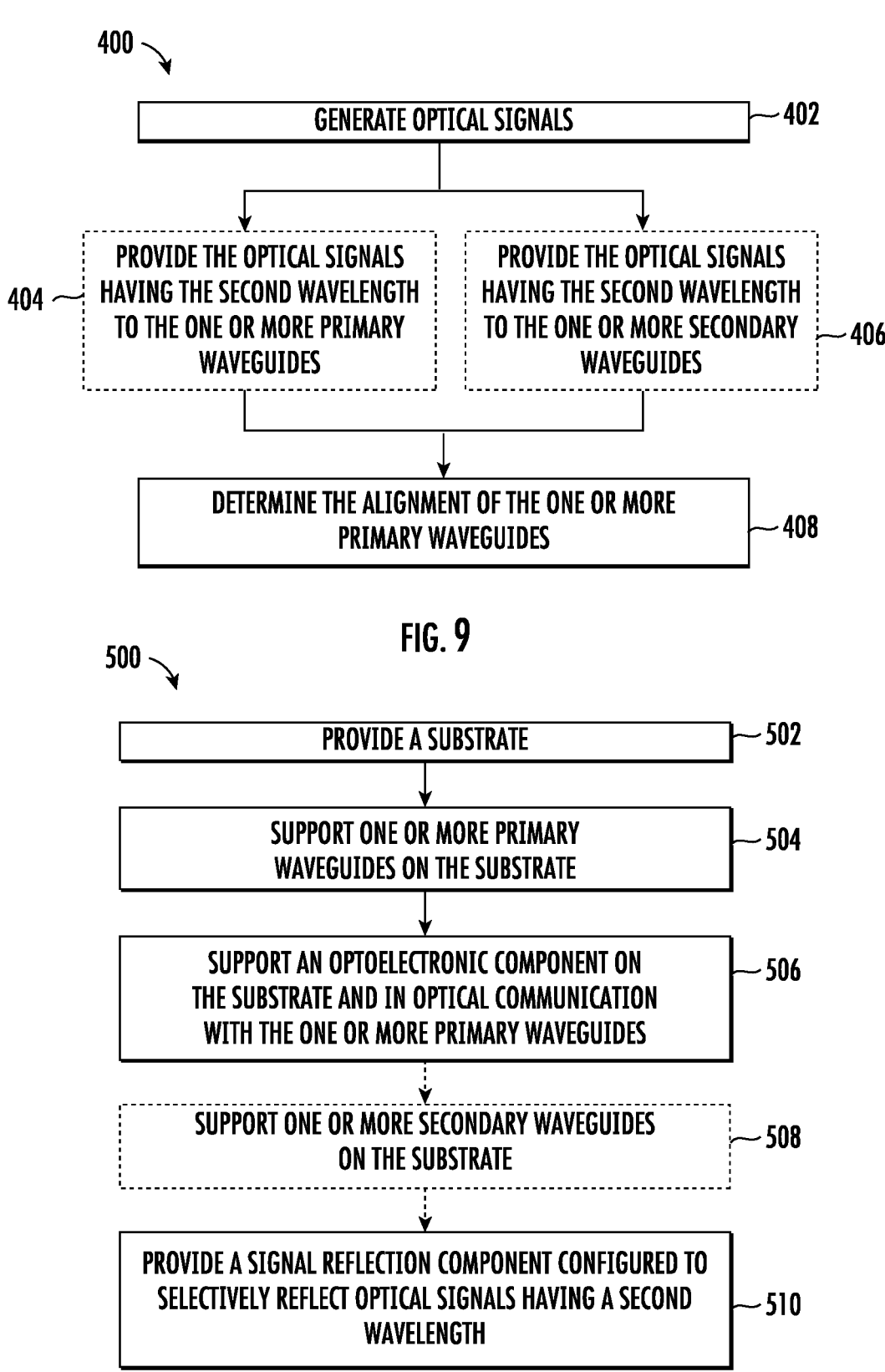

400

GENERATE OPTICAL SIGNALS — 402

404 — PROVIDE THE OPTICAL SIGNALS HAVING THE SECOND WAVELENGTH TO THE ONE OR MORE PRIMARY WAVEGUIDES

PROVIDE THE OPTICAL SIGNALS HAVING THE SECOND WAVELENGTH TO THE ONE OR MORE SECONDARY WAVEGUIDES — 406

DETERMINE THE ALIGNMENT OF THE ONE OR MORE PRIMARY WAVEGUIDES — 408

PROVIDE A SUBSTRATE — 502

SUPPORT ONE OR MORE PRIMARY WAVEGUIDES ON THE SUBSTRATE — 504

SUPPORT AN OPTOELECTRONIC COMPONENT ON THE SUBSTRATE AND IN OPTICAL COMMUNICATION WITH THE ONE OR MORE PRIMARY WAVEGUIDES — 506

SUPPORT ONE OR MORE SECONDARY WAVEGUIDES ON THE SUBSTRATE — 508

PROVIDE A SIGNAL REFLECTION COMPONENT CONFIGURED TO SELECTIVELY REFLECT OPTICAL SIGNALS HAVING A SECOND WAVELENGTH — 510

FIG. 10

OPTICAL DEVICES, SYSTEMS, AND METHODS FOR WAVEGUIDE ALIGNMENT

TECHNOLOGICAL FIELD

Example embodiments of the present disclosure relate generally to light processing systems and, more particularly, to optical devices and methods for aligning waveguides used in light processing systems.

BACKGROUND

Communication networks, channels, light processing systems, and the like are employed in a variety of applications in order to transmit data from one location to another, process light, modulate light, and/or the like. An example communication network may often leverage optical devices, modules, etc. to provide these communications. For example, optical devices or modules may use waveguides that are often required to have high efficiency and/or low insertion-loss (IL). Applicant has identified a number of deficiencies and problems associated with networking systems and associated communications. Through applied effort, ingenuity, and innovation, many of these identified problems have been solved by developing solutions that are included in embodiments of the present disclosure, many examples of which are described in detail herein.

BRIEF SUMMARY

Systems, apparatuses, and methods are disclosed herein for waveguide alignment. An example optical module for aligning waveguides may include a substrate and one or more primary waveguides supported by the substrate. The optical module may further include an optoelectronic component supported by the substrate and in optical communication with the one or more primary waveguides. The optoelectronic component may be configured for use with optical signals having a first wavelength. The optical module may also include a signal reflection component configured to selectively reflect optical signals having a second wavelength so as to determine an alignment of the one or more primary waveguides.

In some embodiments, the second wavelength may be different than the first wavelength.

In some embodiments, the one or more primary waveguides may define the signal reflection component.

In some further embodiments, the one or more primary waveguides may further include a plurality of primary waveguides each defining respective signal reflection components.

In some embodiments, the optical module may further include one or more secondary waveguides supported by the substrate.

In some further embodiments, the one or more secondary waveguides may define the signal reflection component.

In some still further embodiments, at least one of the one or more primary waveguides may be bounded on the substrate by a pair of secondary waveguides defining respective signal reflection components.

In some embodiments, the one or more primary waveguides further include at least a first primary waveguide. In such an embodiment, the optical module may include a pair of secondary waveguides supported by the substrate on opposing sides of the first primary waveguide and each of the pair of secondary waveguides may define respective signal reflection components.

In some embodiments, the signal reflection component may include a Bragg grating.

In some further embodiments, a reflection coefficient of the Bragg grating may be configured to reflect optical signals having the second wavelength.

In any embodiment, the optoelectronic components may be a photonic integrated circuit (PIC) or a planar lightwave circuit (PLC).

In some embodiments, the one or more secondary waveguides may be disposed along a peripheral edge of the substrate so as to form a loopback, and the signal reflection component may be configured to selectively direct optical signals having a second wavelength into the one or more secondary waveguides forming the loopback.

In any embodiment, the optical module may be optically coupled with a testing device. In some instances, the testing device may be optically coupled with the one or more primary waveguides and configured to provide optical signals to the one or more primary waveguides having the second wavelength and determine the alignment of the one or more primary waveguides based upon a reflection of the optical signals having the second wavelength. In some instances, the testing device may be coupled with the one or more secondary waveguides and configured to provide optical signal to the one or more secondary waveguides having the second wavelength and determine the alignment of the one or more primary waveguides based upon a reflection of the optical signals having the second wavelength.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 9 illustrates an example method for determining an alignment of one or more primary waveguides in accordance with one or more embodiments of the present disclosure;

FIG. 10 illustrates an example method of manufacturing an example optical module in accordance with one or more embodiments of the present disclosure;

DETAILED DESCRIPTION

Overview

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. Furthermore, as would be evident to one of ordinary skill in the art in light of the present disclosure, the terms "substantially" and "approximately" indicate that the referenced element or associated description is accurate to within applicable engineering tolerances.

Figure 1:
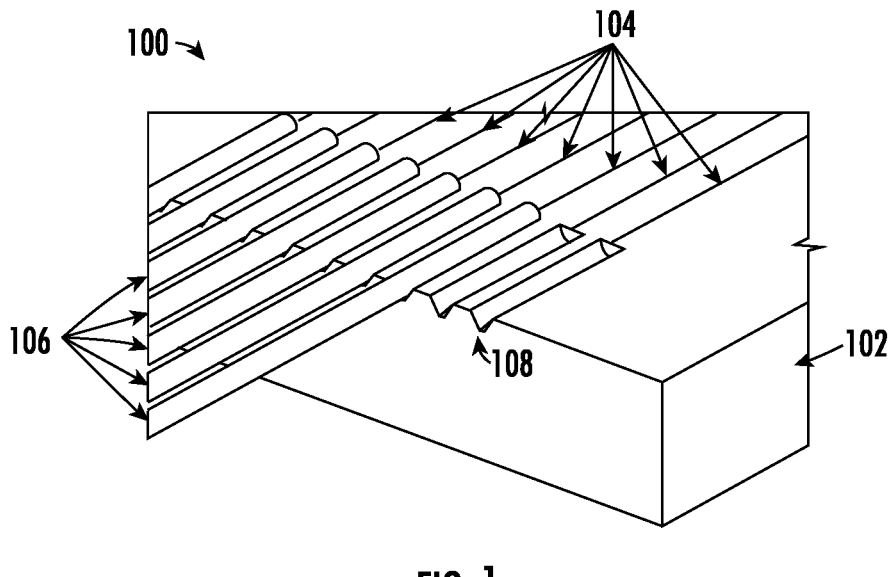
FIG. 1 illustrates an example interface between an optical module and optical fibers in accordance with one or more embodiments of the present disclosure.

As described above, optical devices, modules, and/or the like, such as those used in telecommunications and computing, are often interconnected via waveguides. As shown in FIG. 1, for example, an optical module 100 may include a substrate 102 (e.g., silicon, glass, or the like) that defines waveguides 104. As would be evident to one or ordinary skill in the art, the waveguides 104 may refer to the medium by which optical signals may be transmitted. For example, the waveguides 104 may refer to the physical structure through which light (e.g., optical signals) propagates, such as between optoelectronic components (e.g., optical transmitters, optical receivers, optical transceivers, PICs, etc.) of the optical module 100 and optical fibers 106 optically coupled with the optical module 100. In some instances, the optical module 100 may attempt to align the optical fibers 106 and the waveguides 104 to ensure proper optical signal transmission between these components via one or more passive techniques (e.g., V-shaped grooves or the like). Although described herein with reference to optical devices and associated techniques used in communication systems, the present disclosure contemplates that the optical devices of the present disclosure may be applicable to light processing systems of any type or application. For example, the optical devices described herein may be applicable to sensing applications, biosensing applications, spectroscopy applications, computing applications, and/or the like without limitation.

Figure 2A:
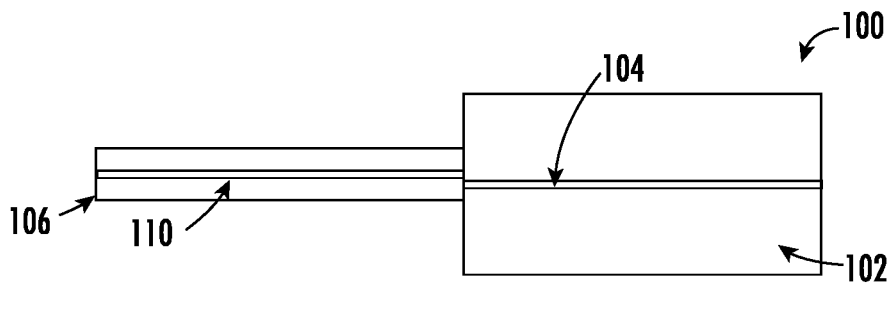
FIGS. 2A-2B illustrate top views of example misalignments between the optical modules and optical fibers of FIG. 1 that are addressed by the embodiments of the present disclosure.
Figure 2B:
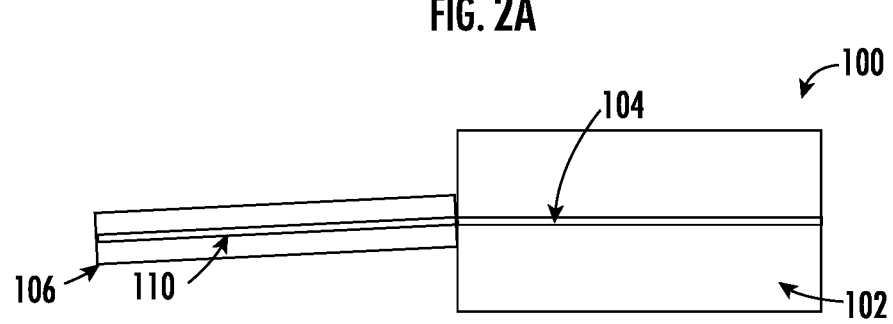

As shown in FIGS. 2A-2B, however, when coupling light into these waveguides 104, misalignment may occur. For example, a lateral misalignment may occur in which the center of the fiber core 110 of the optical fiber 106 is offset (e.g., laterally offset) relative to the center of the waveguide 104 as shown in FIG. 2A. Additionally or alternatively, an angular misalignment may occur in which the fiber core 110 of the optical fiber 106 is offset is at an angle relative to the optical axis of the waveguide 104. Said differently, misalignment may refer to any interfacing between the optical fibers 106 (e.g., the associated fiber cores 110) and the waveguides 104 that results in improper optical coupling between these components. This misalignment may result in degradation to the optical signals transmitted by these device, increased insertion-loss, decreased efficiency, and/or the like.

Figure 3:
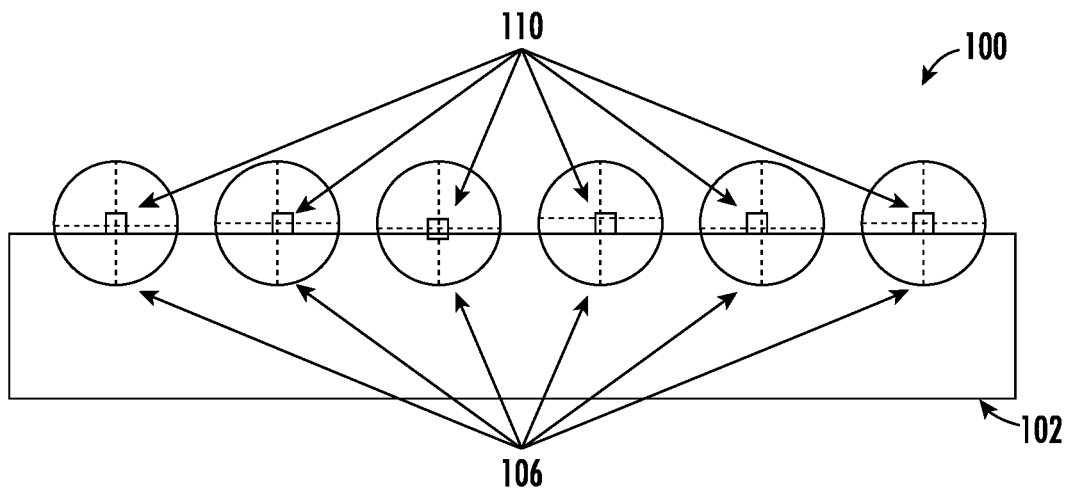
FIG. 3 illustrates a side view of the example misalignments of FIGS. 2A-2B that are addressed by the embodiments of the present disclosure.

Conventional attempts at preventing or correcting lateral and angular misalignment often rely upon waveguide loopbacks that are disposed at different positions in a waveguide array, such as along a peripheral edge of the optical module or device. By way of a non-limiting example, a traditional loopback may refer to a waveguide defined by the substrate that is not optically coupled with optoelectronic components (e.g., optical transmitters, optical receivers, PICs, etc.) of the optical module. These loopbacks may be supplied with light on one or more ends (e.g., ends of the looped waveguide that terminate at a peripheral edge of the substrate) in order to determine if the light substantially aligns with the optical path of the loopback. These loopbacks may operate to align waveguides that are positioned near the loopback; however, waveguides that are centrally located on the optical device (e.g., sufficiently distant from the loopback) may still have lateral and/or angular misalignment such as shown in the side view of FIG. 3. As shown, the optical fibers 106 (e.g., the fiber cores 110) that are disposed proximate the peripheral edge of the substrate 102 may be substantially aligned with the optical path of the waveguides 104; however, the remaining optical fibers 106 (e.g., the fiber cores 110) may include lateral and/or angular misalignment resulting in insertion-loss for these waveguides 104.

In order to solve these problems and others, the embodiments of the present disclosure provide optical modules that include signal reflection components (e.g., Bragg gratings, reflective components, spectral filters, etc.) that may reflect optical signals at a wavelength other than the working wavelength of the optical module for use in aligning each of the waveguides of the optical module. In some instances, these signal reflection components may be formed by the primary waveguides (e.g., the waveguides that transmit the working wavelength(s)). In other embodiments, secondary waveguides may be positioned about the substrate (e.g., on opposing sides of primary waveguides or otherwise) and define the signal reflection components. To align the primary waveguides, optical signals at the second wavelength may be reflected to a testing device by the signal reflection components so as to identify lateral and/or angular misalignment of the primary waveguides. In doing so, the devices, systems, and methods of the present disclosure may provide alignment for each individual waveguide, a feature not found in traditional implementations. Although described herein with reference to lateral and/or angular misalignment, the present disclosure contemplates that the embodiments described herein may account for optical coupling losses of any kind without limitation.

As described herein, the optical modules and associated testing systems of the present disclosure may be described with reference to a substrate that "supports" various optoelectronic components. For example, the optical modules of the present disclosure may be described as supporting one or more waveguides (e.g., primary waveguides, secondary waveguides, etc.), optoelectronic components, signal reflection components, and/or the like. The present disclosure contemplates that the substrate may support, define, or otherwise be associated with these optoelectronic components without limitation. By way of example, the optoelectronic components may be formed as part of the substrate during manufacturing, growing, or otherwise forming the substrate. Said differently, forming the substrate used for the optical modules described herein may also include at least partially forming the optoelectronic components of the optical module.

Example Optical Modules and Systems for Aligning Waveguides

Figure 4:
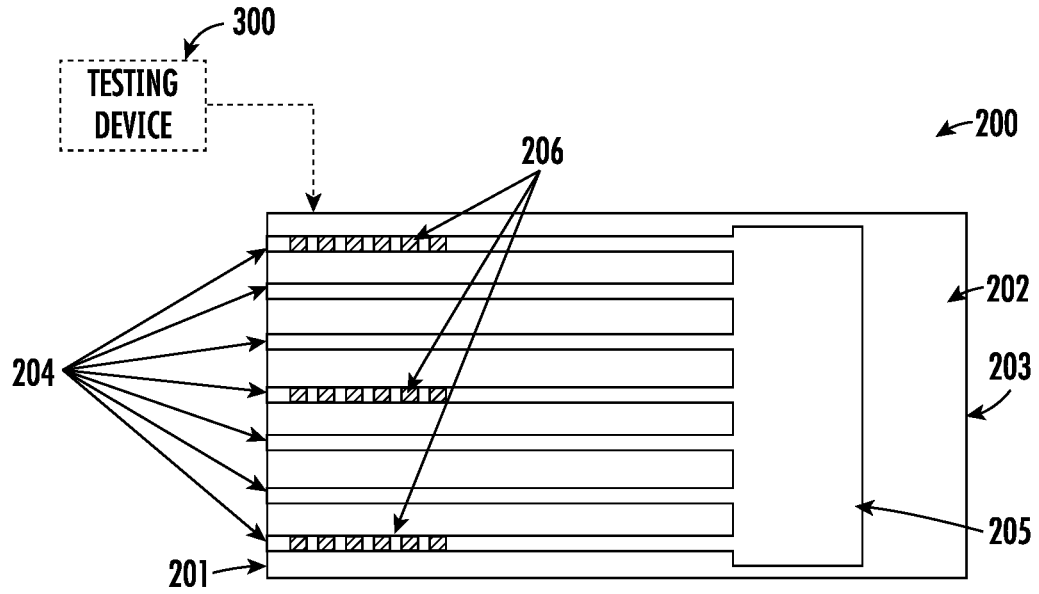
FIG. 4 illustrates an example optical module for aligning waveguides with signal reflection components defined by primary waveguide(s) in accordance with one or more embodiments of the present disclosure.

With reference to FIG. 4, an example optical module 200 for aligning waveguides is illustrated. As shown, the optical module 200 may include a substrate 202 that defines a first end 201 and a second end 203. The substrate 202 may comprise a PIC (e.g., formed of silicon or the like), a PLC (e.g., formed of glass or the like), etc. configured to support various optical, electronic, etc. components thereon. The substrate 202 may, in some embodiments, comprise a dielectric material, a glass material, a polymer material, an amorphous material, a semiconductor material, and/or the like. Said differently, the present disclosure contemplates that the substrate 202 may comprise any material configured for use with optical components, electrical components, etc. so as to be coupled with, support, or otherwise interact with one or more circuitry components, such as described hereafter with reference to the operations of FIG. 9. In some embodiments, the example optical module 200 may be passive (e.g., non-electronic) such that the substrate 202 may be configured to support the optical components (e.g., waveguides) described hereinafter that support optical signals (e.g., light) without electronic functionalities.

The substrate 202 may define a first end 201 and a second end 203 that may be, as shown, positioned opposite the first end 201. By way of example, the substrate 202 may define a rectangular cross-sectional shape such that the first end 201 is substantially parallel with respect to the second end 203. Although illustrated and described herein with reference to a first end 201 and a second end 203 that are positioned on opposing ends of a rectangular substrate 202, the present disclosure contemplates that the substrate 202 may be dimensioned (e.g., sized and shaped) based upon the intended application of the optical module 200. Furthermore, the substrate 202 may define any number of ends located at any relative position or orientation based upon the intended application of the optical module 200.

With continued reference to FIG. 4, the optical module 200 may include one or more primary waveguides 204 supported by the substrate 202. As described above, the primary waveguides 204 may refer to the physical structure through which optical signals (e.g., light) may propagate. For example, the one or more primary waveguides 204 may include optical fiber waveguides, dielectric waveguides, liquid light guides, liquid waveguides, and/or the like through which optical signals may propagate based upon the intended application of the optical module 200. Furthermore, these primary waveguides 204 may include any geometry (e.g., planar, strip, fiber, etc.), modal structure (e.g., single-mode, multi-mode, etc.), and/or refractive index distribution (e.g., step, gradient, etc.) based on the intended application of the optical module 200.

In some embodiments, the one or more primary waveguides 204 may be supported by the substrate 202 (e.g., via a surface of the substrate 202). In other embodiments, the surface of the substrate 202 may at least partially form the one or more primary waveguides 204, such as in instances in which the one or more primary waveguides 204 are formed via optical lithography or the like. As shown, the one or more primary waveguides 204 may be disposed longitudinally on the substrate 202 and terminate on at least the first end 201 of the substrate 202 so as to interface with optical fiber(s) as described herein. Although illustrated with a plurality of a parallel waveguides extending longitudinally along the substrate 202, the present disclosure contemplates that the number of primary waveguides 204, the relative positioning of the primary waveguides 204, the orientation of the primary waveguides 204, and/or the like may vary based upon the intended application of the of the optical module 200. Similarly, although illustrated with primary waveguides 204 that terminate at the first end 201 of the substrate 202 so as to optically connect with one or more optical fibers, the present disclosure contemplates that the one or more primary waveguides 204 may terminate at any location on the substrate so long as optical coupling with the primary waveguides 204 may occur.

As described hereafter with reference to example optoelectronic components, the primary waveguides 204 may be configured to transmit optical signals having a first wavelength that is associated with the operation of the optoelectronic component(s) supported by the substrate 202. By way of example, optical modules, such as the example optical module 200, may be configured for use with optical signals having particular characteristics (e.g., wavelength, mode, modulation technique, bandwidth, signal encoding, etc.) that are application-specific. Said differently, the optical modules 200 of the present disclosure are described herein with reference to a first wavelength that corresponds to a working wavelength or working spectral range at which optical signals (e.g., light) that are conveying or encode data are transmitted. By way of a non-limiting example, the first wavelength may be approximately 1300 nm, 1550 nm, and/or a group of working wavelengths around these wavelengths.

With continued reference to FIG. 4, the optical module 400 may include an optoelectronic component 205 supported by the substrate and in optical communication with the one or more primary waveguides 204. The optoelectronic component 205 may refer to any device (or portion of a device) configured to detect (e.g., process, modulate, etc.) and/or emit electromagnetic radiation, often in the form of light encoding underlying data. By way of example, the optoelectronic component 205 may be an optical transmitter (e.g., vertical-cavity surface-emitting laser (VCSEL) or the like) configured to generate optical signals that are received by the one or more primary waveguides 204 optically coupled thereto. These optical signals may, for example, be transmitted via the one or more primary waveguides 204 to optical fibers coupled with the one or more primary waveguides 204 and further transmitted by these optical fibers to corresponding optoelectronic components (e.g., optical receivers) optically coupled with another end of the optical fiber(s). By way of an additional example, the optoelectronic component 205 may be an optical receiver (e.g., photodiode (PD) or the like) configured to receive optical signals that are transmitted by the one or more primary waveguides 204 optically coupled thereto. For example, one or more corresponding optoelectronic components (e.g., optical transmitters) optically coupled with another end of the optical fiber(s) may generate optical signals that are transmitted via the one or more optical fibers, supplied to the one or more primary waveguides 204, and further received by the optical receiver (e.g., optoelectronic component 205). In some embodiments, the optoelectronic component 205 may be an optical transceiver configured to generate and receive optical signals. The present disclosure contemplates that the optoelectronic component 205 may refer to any component, photonic circuit, device, or the like based upon the intended application of the optical module 200.

As described above, the optoelectronic component 205 may configured for use with optical signals having a first wavelength (e.g., the working wavelength). By way of continued example, the optoelectronic component 205 may therefore be an optical transmitter that generates optical singles having the first wavelength that are received via the one or more primary waveguides 204. These optical signals at the first wavelength may be transmitted by the one or more primary waveguides 204 and into the optical fibers (e.g., optical fibers 106 in FIGS. 1-3) and received by corresponding optical receivers (not shown) configured to receive optical signals at the first wavelength. Similarly, the optoelectronic component 205 may be an optical receiver that receives optical signals having the first wavelength from corresponding optical transmitters (not shown) optically coupled with the optical fibers and the one or more primary waveguides 204. The optoelectronic component 205 as shown may, in some embodiments, be formed as part of a PIC implementation. Although illustrated proximate the second end 203 of the substrate 202, the present disclosure contemplates that the optoelectronic component 205 may be disposed at any position on the substrate 202 so long as optical communication between the optoelectronic component 205 and the one or more primary waveguides 204 may be established.

In order to ensure proper alignment between the one or more primary waveguides 204 and the optical fibers (e.g., optical fibers 106 in FIGS. 1-3) attached thereto, the optical module 200 embodiments of the present disclosure may include one or more signal reflection components 206 configured to selectively reflect optical signals having a second wavelength. This second wavelength may refer to a wavelength that is different from the first wavelength (e.g., the working wavelength or working spectral range at which optical signals that are conveying or encode data are transmitted). As would be evident given the optical signal transmissions used by the optical module 200, the second wavelength reflected by the signal reflection component may be selected so as to prevent interference with optical signals having the first wavelength. In some embodiments, the signal reflection component 206 may be a Bragg grating configured to reflect optical signals having the second wavelength. For example, a reflection coefficient of the Bragg grating (e.g., signal reflection component 206) may be configured to reflect optical signals having the second wavelength. The example Bragg grating (e.g., signal reflection component 206) may refer to a periodic variation in the effective refractive index of the waveguides (e.g., primary waveguide(s) 204 or secondary waveguides 208 described hereafter), which generate a wavelength-specific dielectric mirror for reflecting optical signals (e.g., light) having the second wavelength. Although described herein with reference to a Bragg grating as an example signal reflection component 206, the present disclosure contemplates that any structure, feature, device, etc. may be used by the optical module 200 to reflect optical signals (e.g., light) having the second wavelength.

Figure 11:
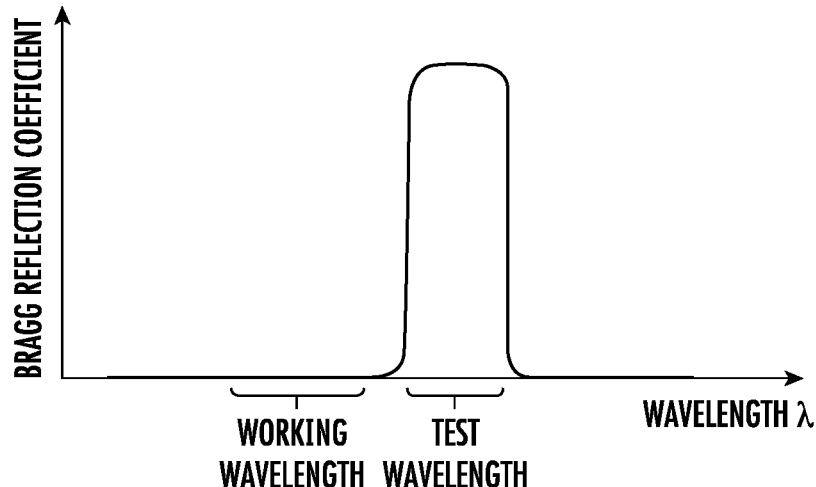
FIG. 11 is a graphical illustration of operation of an example Bragg grating (e.g., signal reflection component) in accordance with one or more embodiments of the present disclosure.

In the embodiment of FIG. 4, one or more of the primary waveguides 204 may define the signal reflection component 206. In such an example implementation, the one or more primary waveguides 204 that are configured to transmit optical signals having the first wavelength (e.g., generated/received by the optoelectronic component 205) may further be configured to support optical signals (e.g., light) having the second wavelength. For example, optical signals (e.g., light) having the second wavelength may be supplied to the one or more primary waveguides 204 (e.g., via a testing device 300 described hereafter), and the signal reflection components 206 may reflect these optical signals (e.g., light) having the second wavelength back to the testing device 300 for use in alignment determinations. The signal reflection components 206 may allow the optical signals having the first wavelength to pass therethrough, such as illustrated in FIG. 11. As shown in the graphical illustration 600 of FIG. 11, the signal reflection component 206 (e.g., a Bragg grating or the like) may reflect optical signals having the second wavelength (e.g., the test wavelength) while optical signals having the first wavelength (e.g., the working wavelength) pass therethrough. In other words, the signal reflection component 206 (e.g., a Bragg grating or the like) may not impact (e.g., or negligibly reflect) optical signals at the working wavelength (e.g., the first wavelength).

The one or more primary waveguides 204 may not be supplied with optical signals having the first wavelength and the second wavelength simultaneously in that the optical signals having the second wavelength are supplied during a testing procedure (e.g., not during operation of the optical module 200). The optical module 200, however, may account for instances in which the optical signals having the first and the second wavelength may coexist within the one or more primary waveguides 204 and, as such, may select a second wavelength that does not interfere with the first wavelength (e.g., sufficiently distinct from the first wavelength).

Although described herein with reference to one or more primary waveguides 204, the present disclosure contemplates that the optical module 200 may include any number (e.g., a plurality of) primary waveguides based upon the intended application of the optical module 200. Furthermore, the present disclosure contemplates that, in some embodiments, each of the plurality of primary waveguides 204 may define a respective signal reflection component 206 used for determining an alignment associated with the particular primary waveguide 204 supporting the respective signal reflection component 206. In other embodiments, only a portion of the plurality of primary waveguides 204 may define a signal reflection component 206. As described hereafter with reference to the method of FIG. 9, the optical module 200 may be formed as part of an optical testing system that includes a testing device 300.

Figure 5:
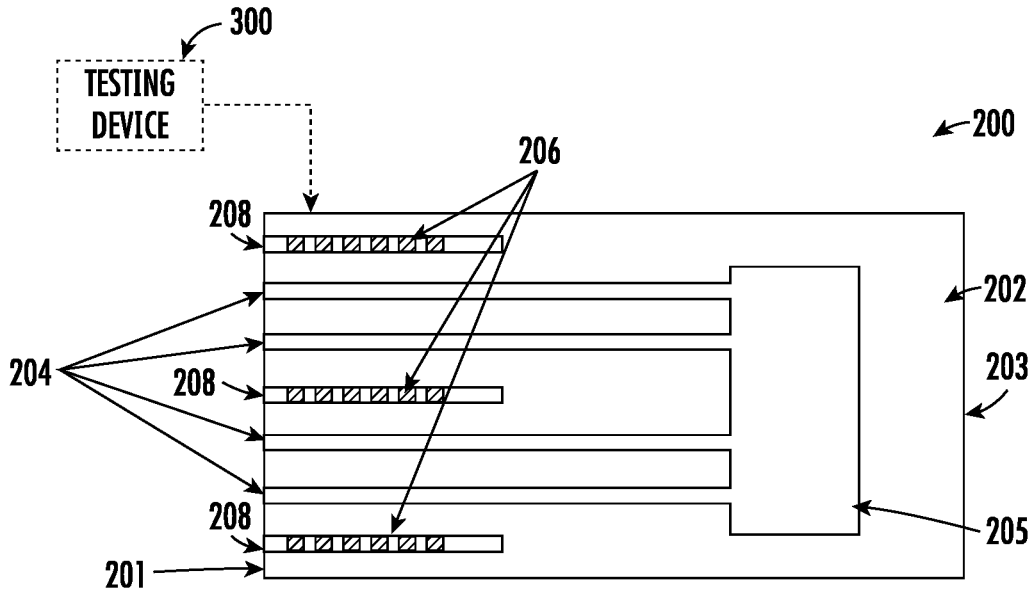
FIGS. 5, 6A, and 6B illustrate example optical modules for aligning waveguides with signal reflection components defined by secondary waveguide(s) in accordance with one or more embodiments of the present disclosure.
Figure 6A:
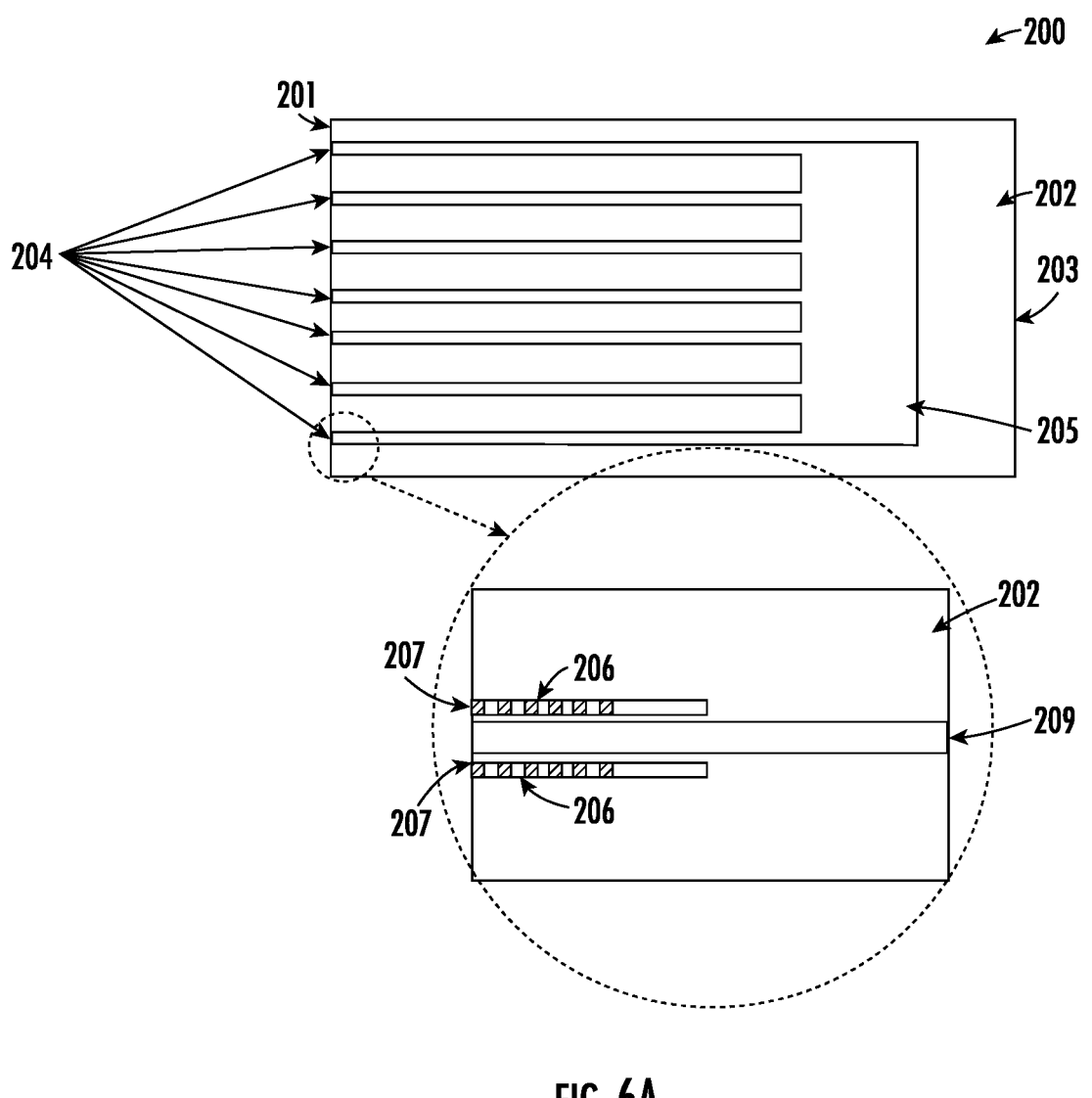
Figure 6B:
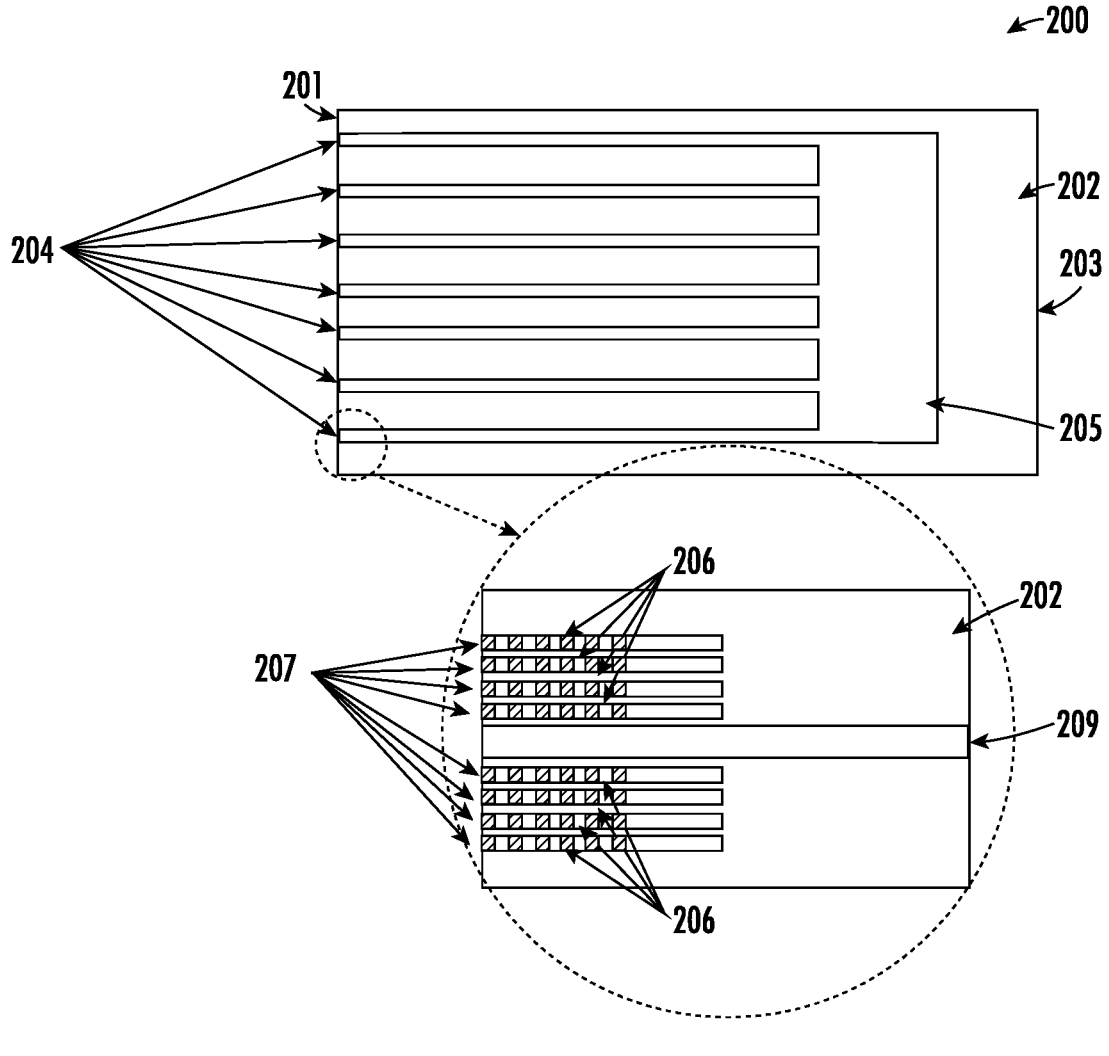

With reference to FIGS. 5, 6A, and 6B, in some embodiments, the optical module 200 may further include one or more secondary waveguides supported by the substrate 202. The one or more secondary waveguides 208 may refer to a physical structure through which optical signals (e.g., light) may propagate. Similar to the primary waveguides 204, the one or more secondary waveguides 208 may include optical fiber waveguides, transparent dielectric waveguides (e.g., formed of plastic and glass), liquid light guides, liquid waveguides, and/or the like through which optical signals may propagate based upon the intended application of the optical module 200. Furthermore, these secondary waveguides 208 may also include any geometry (e.g., planar, strip, fiber, etc.), modal structure (e.g., single-mode, multimode, etc.), and/or refractive index distribution (e.g., step, gradient, etc.) based on the intended application of the optical module 200. In some embodiments, the one or more secondary waveguides 208 may be supported by the substrate 202 (e.g., via a surface of the substrate 202). In other embodiments, the surface of the substrate 202 may at least partially form the one or more secondary waveguides 208, such as in instances in which the one or more secondary waveguides 208 are formed via optical lithography or the like.

As shown, the one or more secondary waveguides 208 may be disposed longitudinally on the substrate 202 and terminate on at least the first end 201 of the substrate 202 so as to interface with optical fiber(s) and/or the testing device 300 described herein. Although illustrated with a plurality of a parallel waveguides extending longitudinally along the substrate 202, the present disclosure contemplates that the number of secondary waveguides 208, the relative positioning of the secondary waveguides 208, the orientation of the secondary waveguides 208, and/or the like may vary based upon the intended application of the of the optical module 200. As would be evident in light of the alignment determinations associated with the present disclosure, the positioning between the secondary waveguides 208 and the primary waveguides 204 may be determined to prevent misalignment (e.g., a closer proximity may result in improved alignment).

As shown in FIG. 5, in some embodiments, the one or more secondary waveguides 208 may be positioned amongst the one or more primary waveguides 204 so as to provide additional locations at which to determine the alignment of the one or more primary waveguides 204. Unlike waveguide loopbacks that, although not operationally required, are often disposed along a peripheral edge of the optical module or device, the secondary waveguides 208 may be centrally located on the substrate 202. As shown in FIG. 6A, in some embodiments, at least one of the one or more primary waveguides (e.g., a first primary waveguide 209) may be bounded on the substrate by a pair of secondary waveguides 207 defining respective signal reflection components 206. In some embodiments, each of the primary waveguides 204 may be bounded by respective pairs of secondary waveguides 207 that define signal reflection components 206 such that the pair of secondary waveguides 207 are used to determine an alignment for the first primary waveguide 209 bounded by the secondary waveguides 207. For example, the testing system 300 described herein may supply optical signals (e.g., light) having the second wavelength to the secondary waveguides 207 that bound the example first primary waveguide 209. By aligning the pair of secondary waveguides 207 (e.g., on opposing sides of the first primary waveguide 209). The first primary waveguide 209 may be aligned by shifting the first primary waveguide 209 to the middle of the pair of secondary waveguides 207.

The present disclosure, however, contemplates that the optical module 200 may include any number of the one or more secondary waveguides 207, 208 supporting optical reflection components 206 at any position relative to the one or more primary waveguides 204 based upon the intended application of the optical module 200. As shown in FIG. 6B, for example, a plurality of secondary waveguides 207 that each define signal reflection components 206 may be positioned about or around (e.g., on opposing sides of) the example first primary waveguide 209 (e.g. bounding the first primary waveguide 209 or the like). In doing so, the plurality of secondary waveguides 207 may operate to improve the alignment of the first primary waveguide 209. In some embodiments, for example, as the number of secondary waveguides 207 defining associated signal reflection components 206 proximate the example first primary waveguide 209 increases, the accuracy of the alignment associated with the first primary waveguide 209 may similarly increase.

To provide this alignment determination, in some embodiments, the one or more secondary waveguides may define the signal reflection component 206. In contrast to the optical module illustrated in FIG. 4, in some embodiments, secondary waveguides 208, 207 as shown in FIGS. 5, 6A, and 6B may be supported by the substrate for performing waveguide alignment operations. Unlike the primary waveguides 204 that may transmit optical signals at the first wavelength that encode data that is usable by the optoelectronic component 205, the one or more secondary waveguides 207, 208 may be, in some embodiments, only used to alignment purposes. Said differently, the one or more secondary waveguides 207, 208 may extend from the first end 201 of the substrate 202 but may not be in optical communication with the optoelectronic component 205. In this way, the one or more secondary waveguides 207, 208 may not receive optical signals having the first wavelength and may only receive optical signals having the second wavelength for alignment determinations. Given that the one or more secondary waveguides are not optically coupled with the optoelectronic component 205, the one or more secondary waveguides 207, 208 may be supplied optical signals (e.g., light) having any wavelength supported by the signal reflection component 206. Said differently, the one or more primary waveguides 204 and the one or more secondary waveguides are independent such that the wavelengths of the optical signals (e.g., light) supplied to these waveguides may be selected without consideration of signal interference (e.g., the signal reflection component 206 does not exist in the optical path of the primary waveguides 204).

Figure 7A:
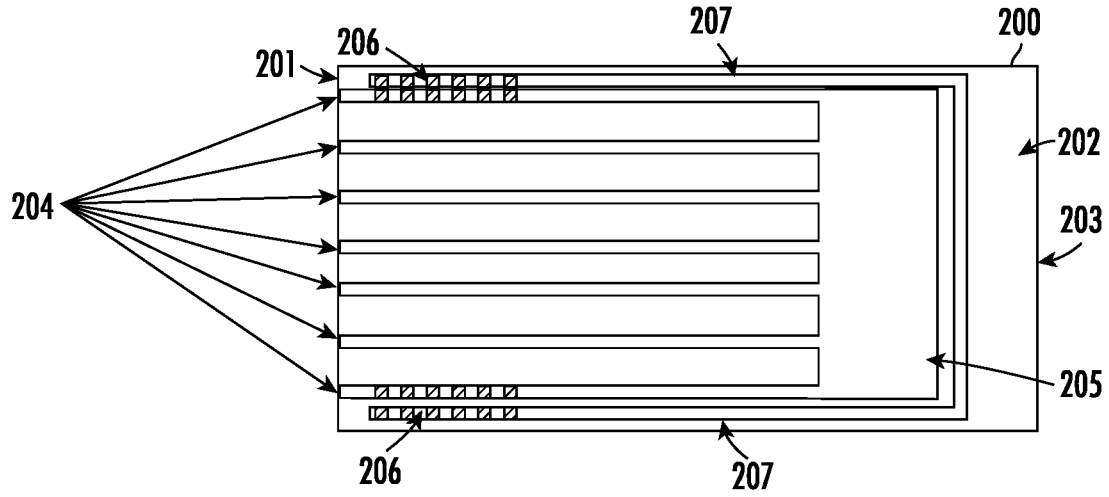
FIG. 7A illustrates an example optical module for aligning waveguides with a secondary waveguide forming a loopback in accordance with one or more embodiments of the present disclosure.

With reference to FIG. 7A, in some embodiments, the one or more secondary waveguides 207 may be configured to connect any two (2) primary waveguides 204, such as two (2) adjacent primary waveguides 204, to two (2) primary waveguides 204 disposed along a peripheral edge of the substrate 202, etc. so as to form one or more loopbacks. In traditional loopback-based devices, the overall size of the substrate supporting the loopback may be increased to accommodate the loopback. For example, a traditional loopback may require that a light source be directly connected to the loopback for alignment purposes which may require additional surface area on the substrate to accommodate such a connection. In the optical module 200 of FIG. 7A, however, the secondary waveguide 207 may be disposed along a peripheral edge of the substrate proximate primary waveguides 204. In such an embodiment, the component 206 may be defined by the primary waveguide 204 and/or the secondary waveguide 207 and may be configured to direct optical signals having the second wavelength into the secondary waveguide 207. Unlike the functionality of FIGS. 4-6B in which the components 206 (e.g., signal reflection component(s) 206) operate to selectively reflect optical signals having the second wavelength, the components 206 of FIG. 7A operate as a cross-coupler that causes optical signals (e.g., light) having the second wavelength to be directed from the primary waveguide 204 to the secondary waveguide 207 without impacting optical signals (e.g., light) having the first wavelength.

By way of a non-limiting example, optical signals having the first wavelength may be supplied to the primary waveguide 204 and the component 206 may allow the optical signals having this first wavelength to pass to the optoelectronic component 205. For aligning the primary waveguides 204, a second wavelength that is different from the first wavelength may be provided to the primary waveguide 204. The component 206 may direct or redirect the optical signals into the secondary waveguide 207, and the optical signals having the second wavelength may be transmitted by the secondary waveguide 207 to an opposing peripheral edge of the substrate 202 proximate another primary waveguide 204. The component 206 at the opposing end of the secondary waveguide 207 may direct the optical signals having the second wavelength into the other primary waveguide 204 for further receipt by an optical receiver (e.g., photodiode or the like). In doing so, the embodiment of FIG. 7A may provide additional mechanisms for aligning primary waveguides 204 located proximate the peripheral edges of the substrate 202 without increasing the dimensions (e.g., size and shape) of the substrate 202.

In some embodiments, the optical module 200 may include signal reflection components 206 that are supported by secondary waveguides 207, 208 and primary waveguides 204, 209. For example, the substrate may support a plurality of primary waveguides 204 and at least one of the primary waveguides 204 may support a signal reflection component 206 for use in determining an alignment of the at least one primary waveguide supporting the signal reflection component 206. The optical module 200 may further include one or more secondary waveguides 207, 208 that also include respective signal reflection components 206 for determining an alignment of the one or more primary waveguides 204 proximate the one or more secondary waveguides 207, 208. In other words, the present disclosure contemplates that the optical modules 200 described herein may the features of FIG. 4, 5, 6A, or 6B, alone or in combination, based upon the intended application of the optical module 200.

Figure 7B:
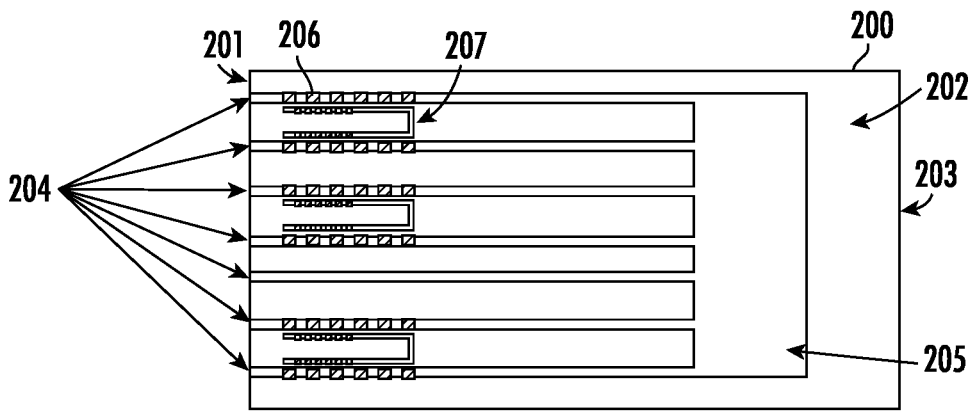
FIG. 7B illustrates an example optical module for aligning waveguides with a plurality of secondary waveguides forming loopbacks in accordance with one or more embodiments of the present disclosure.

With reference to FIG. 7B, in some embodiments, the one or more secondary waveguides 207 may form one or more loopbacks that connect adjacent primary waveguides 204 and are disposed between these primary waveguides 204. Similar to the embodiment of FIG. 7A, the one or more components 206 may be defined by the primary waveguide 204 and/or the secondary waveguide 207 and may be configured to direct optical signals having the second wavelength into the secondary waveguide 207. The components 206 of FIG. 7B may similarly operate as a cross-coupler that causes optical signals (e.g., light) having the second wavelength to be directed from the primary waveguide 204 to the secondary waveguide 207 without impacting optical signals (e.g., light) having the first wavelength.

Figure 8A:
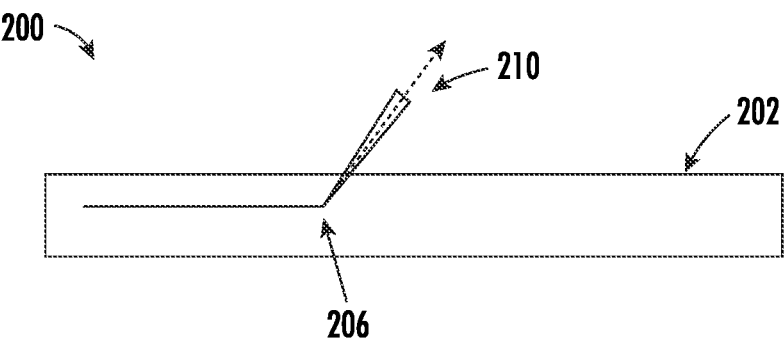
FIGS. 8A-8C illustrate example optical modules in which signal reflection components direct optical signals (e.g., light) out of the substrate in accordance with one or more embodiments of the present disclosure.
Figure 8B:
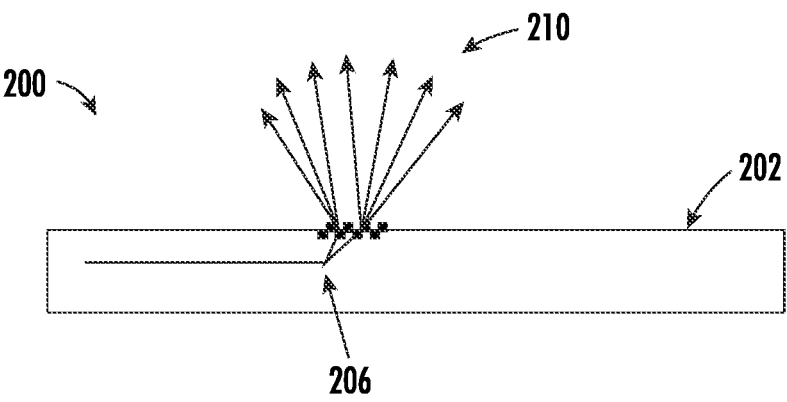
Figure 8C:
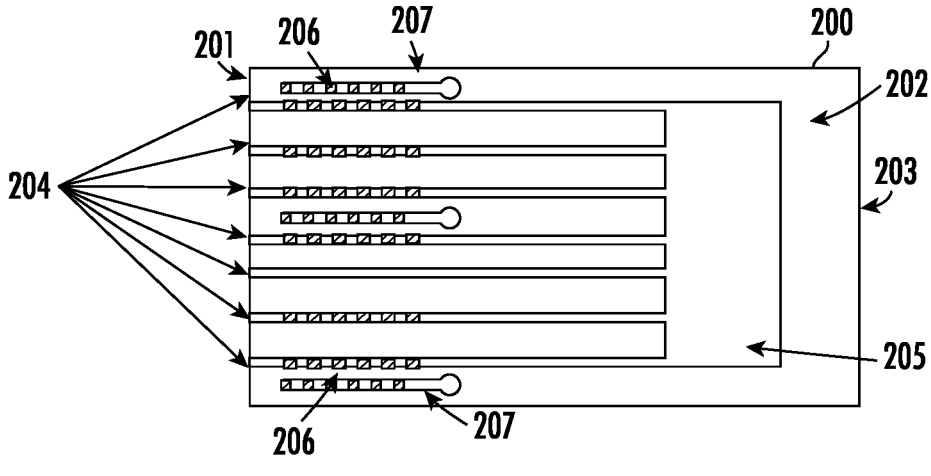

In any of the embodiments described herein, the signal reflection component(s) 206 may be configured selectively reflect (e.g., at least partially direct) optical signals having a second wavelength out of the substrate 202 as shown in FIGS. 8A-8C. As described above, the second wavelength may refer to a wavelength that is different from the first wavelength (e.g., the working wavelength or working spectral range at which optical signals that are conveying or encode data are transmitted). As would be evident given the optical signal transmissions used by the optical module 200, the second wavelength reflected by the signal reflection component 206 may be selected so as to prevent interference with optical signals having the first wavelength. For example, instead of the optical signals having the second wavelength being reflected by the signal reflection component(s) 206 back along the primary waveguides 204 (e.g., the embodiments of FIG. 4) and/or back along the secondary waveguides 208 (e.g., the embodiments of FIGS. 5-7B), the signal reflection components 206 of FIGS. 8A-8B may direct the optical signals 210 outside the surface of the substrate 202.

As shown in FIG. 8A, for example, the component 206 may include a grating coupler that allows the optical signals 210 to be coupled outside of the optical module 200. In such an embodiment, a camera, an optical detector, and/or the like may be configured to detect the optical signals 210 directed outside of the optical module 200 to determine if the one or more primary waveguides 204 are properly aligned. In other embodiments, as shown in FIG. 8B, the component 206 may include a diffusive component or other diffusive area of the substrate 202 configured to diffuse the optical signals 210 such that the optical signals 210 may be viewed by a camera, an optical detector, and/or the like from a plurality of angles. The present disclosure contemplates that the component(s) 206 (e.g., signal reflection components, light coupling components, etc.) of the present application may include any structure, device, etc. configured to at least partially direct a portion of the optical signals 210 out of the optical module 200 for alignment purposes. FIG. 8C illustrates a top view of the embodiments of FIGS. 8A-8B in which the optical signals 210 may be coupled outside of the optical module 200.

Example Testing Device and Alignment Methods

As described above and illustrated in FIGS. 4, 5, and 12A-12C, the optical module 200 may be communicably coupled with a fiber array unit (FAU) that is communicably coupled with a testing device 300 so as to form an optical testing system. The testing device may be configured to determine the alignment of the one or more primary waveguides 204 based upon a reflection of optical signals by the one or more signal reflection components 206 having the second wavelength (e.g., a power determined for the reflected optical signals). As described hereafter with reference to FIG. 9, in the embodiment of FIG. 4, the testing device 300 may be optically coupled with an FAU that is optically coupled with the one or more primary waveguides 204 and provide optical signals to the one or more primary waveguides 204 having the second wavelength. The signal reflection component(s) 206 defined by the primary waveguides 204 may reflect the optical signals having the second wavelength back to the testing device 300, and the testing device 300 may use these reflections to identify misalignments associated with the primary waveguides 204. Additionally or alternatively, in the embodiments of FIGS. 5, 6A, 6B, 7A, and 7B the testing device 300 may be optically coupled with an FAU 301 that is optically coupled with the one or more secondary waveguides 207, 208 and provide optical signals to the one or more secondary waveguides 207, 208 having the second wavelength. The signal reflection component(s) 206 defined by the secondary waveguides 207, 208 may reflect the optical signals having the second wavelength back to the testing device 300, and the testing device 300 may use these reflections to identify misalignments associated with the primary waveguides 204 proximate the secondary waveguides 207, 208.

The testing device 300 may include circuitry, networked processors, or the like configured to perform some or all of the apparatus-based (e.g., waveguide alignment-based) processes described herein and may be any suitable controller, network card, graphical processing unit (GPU), microcontroller, computing device, network server, and/or other type of processing device. In this regard, the testing device 300 may be embodied by any of a variety of devices. For example, the testing device 300 may be configured to receive/transmit data and may include any of a variety of fixed terminals, such as a server, microcontroller, processor, transceiver, switcher, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals.

The testing device 300 may include a processor, a memory, communications circuitry, input/output circuitry, and/or the other circuitry components for determining an alignment or misalignment of the primary waveguides 204. The testing device 300 may be configured to execute some of the operations described below in connection with FIG. 9. The use of the term "circuitry" as used herein includes particular hardware configured to perform the functions associated with respective circuitry described herein. In some embodiments, various elements or components of the circuitry of the testing device 300 may be housed by the optical module 200. It will be understood in this regard that some of the components described in connection with the testing device 300 may be housed within one of these devices, while other components may be housed within another of these devices, or by yet another device not expressly illustrated in FIGS. 1-6.

By way of example, in some embodiments, the testing device 300 may include components (e.g., light-emitting diodes (LEDs), VCSELs, etc.) for generating or otherwise providing optical signals (e.g., light) having the second wavelength. Given that the reflection of the optical signals at the second wavelength is used alignment purposes, in some embodiments, the optical signals generated or otherwise provided by the testing device 300 may not encode or otherwise convey data (e.g., in contrast to the optical signals at the first wavelength). In order to receive the reflected optical signals at the second wavelength, the testing device 300 may include one or more optical receivers (e.g., photodiodes or the like). In any embodiment, the testing device 300 may include any optical and/or optoelectronic components for supplying optical signals having the second wavelength to the optical module.

As described above, the testing device 300 may include a processor (and/or co-processor or any other processing circuitry assisting or otherwise associated with the processor) that may be in communication with the memory via a bus for passing information among components of the testing device 300. The memory may be non-transitory and may include, for example, one or more volatile and/or non-volatile memories. For example, the memory may be an electronic storage device (e.g., a non-transitory computer readable storage medium). The memory may be configured to store information, data, content, applications, instructions, or the like, for enabling the testing device 300 to carry out various functions in accordance with example embodiments of the present disclosure. The processor may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the security circuitry, and/or remote or "cloud" processors.

In an example embodiment, the processor may be configured to execute instructions stored in the memory or otherwise accessible to the processor. Alternatively, or additionally, the processor may be configured to execute hardcoded functionality. As such, whether configured by hardware or by a combination of hardware with software, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the testing device 300 may provide or supplement the functionality of particular circuitry.

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

Example Methods for Alignment Determinations

With reference to FIG. 9, an example method (e.g., method 400) for determining an alignment of one or more primary waveguides 204 is illustrated. As shown in operation 402, the method may include generating optical signals at the second wavelength. As described above, the testing device 300 may include various optical and/or optoelectronic components configured to generate optical signals (e.g., emit light) at the second wavelength. In instances in which the testing device is optically coupled with the one or more primary waveguides 204 (e.g., FIG. 4), the second wavelength may be different from the first wavelength to ensure that the optical signals (e.g., light) are reflected by the signal reflection components 206. In instances in which the testing device 300 is optically coupled with the one or more secondary waveguides 207, 208 (e.g., FIG. 5, 6A, or 6B), the second wavelength may refer to any wavelength without limitation. The present disclosure contemplates that the generation of the optical signals 402 may occur in response to or as part of a testing or alignment procedure that is configured to identify misalignments, if any, associated with the one or more primary waveguides.

Thereafter, as shown in operation 404, the method 400 may include providing the optical signals having the second wavelength to the one or more primary waveguides 204. As described above with reference to FIG. 4, in some embodiments, one or more of the primary waveguides 204 may define the signal reflection component 206. In such an example implementation, the one or more primary waveguides 204 that are configured to transmit optical signals having the first wavelength (e.g., generated/received by the optoelectronic component 205) may further be configured to support optical signals (e.g., light) having the second wavelength. For example, optical signals (e.g., light) having the second wavelength may be supplied to the one or more primary waveguides 204 (e.g., via the testing device 300), and the signal reflection components 206 may reflect these optical signals (e.g., light) having the second wavelength back to the testing device 300. The signal reflection components 206 may allow the optical signals having the first wavelength to pass therethrough.

Additionally or alternatively, as shown in operation 406, the method 400 may include providing the optical signals having the second wavelength to the one or more secondary waveguides 208. As described above with reference to FIGS. 5, 6A, 6B, 7A, and 7B, in some embodiments, the one or more secondary waveguides may define the signal reflection component 206. In contrast to the optical module illustrated in FIG. 4, secondary waveguides 208, 207 as shown in FIGS. 5, 6A, and 6B may be supported by the substrate 202 for performing waveguide alignment operations. Unlike the primary waveguides 204 that may transmit optical signals at the first wavelength that encode data that is usable by the optoelectronic component 205, the one or more secondary waveguides 207, 208 may be only used to alignment purposes. Said differently, the one or more secondary waveguides 207, 208 may extend from the first end 201 of the substrate 202 but may not be in optical communication with the optoelectronic component 205. In this way, the one or more secondary waveguides 207, 208 may not receive optical signals having the first wavelength and may only receive optical signals having the second wavelength for alignment determinations.

Figure 12A:
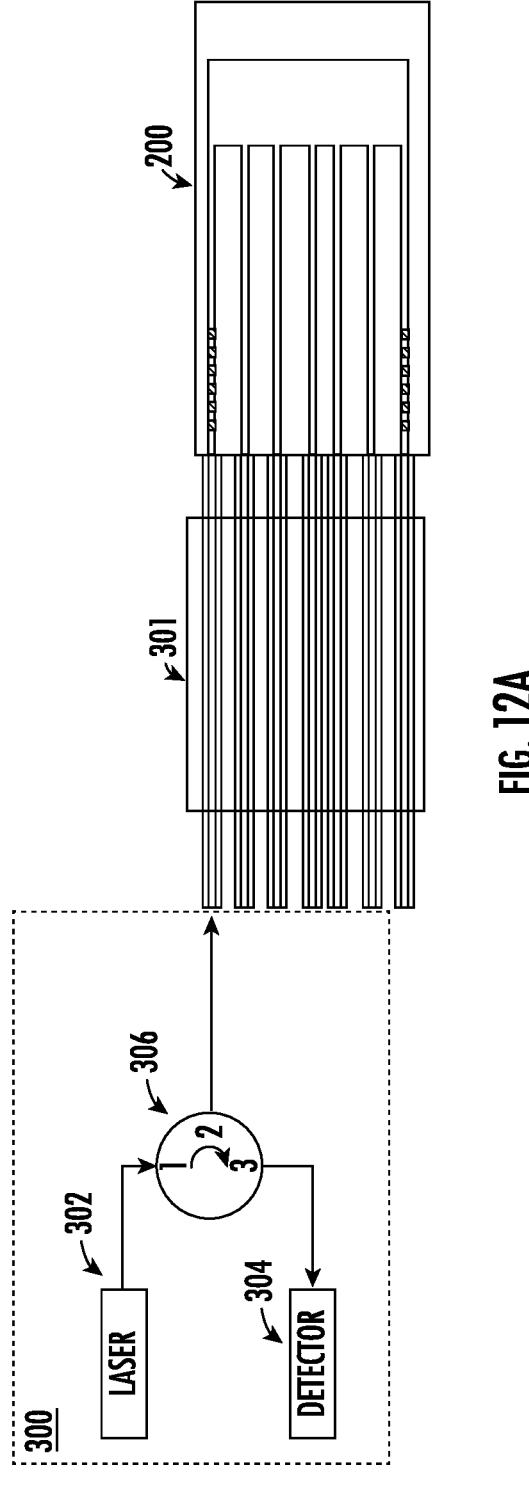
FIGS. 12A-12C illustrate example testing systems for use with the optical modules of the present disclosure.
Figure 12B:
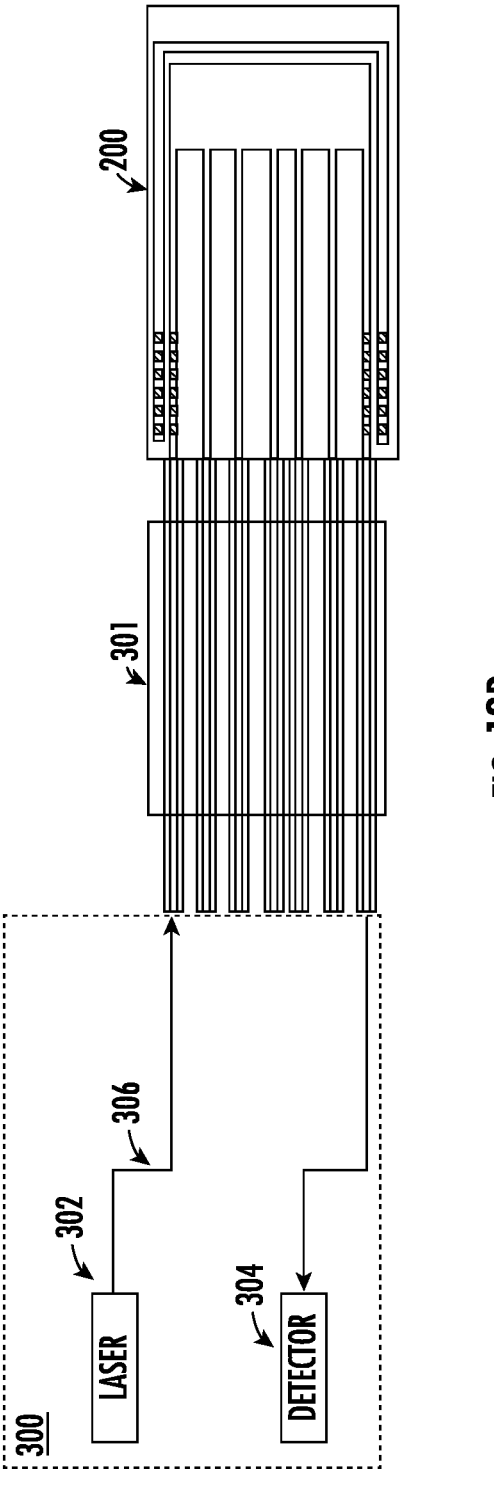
Figure 12C:
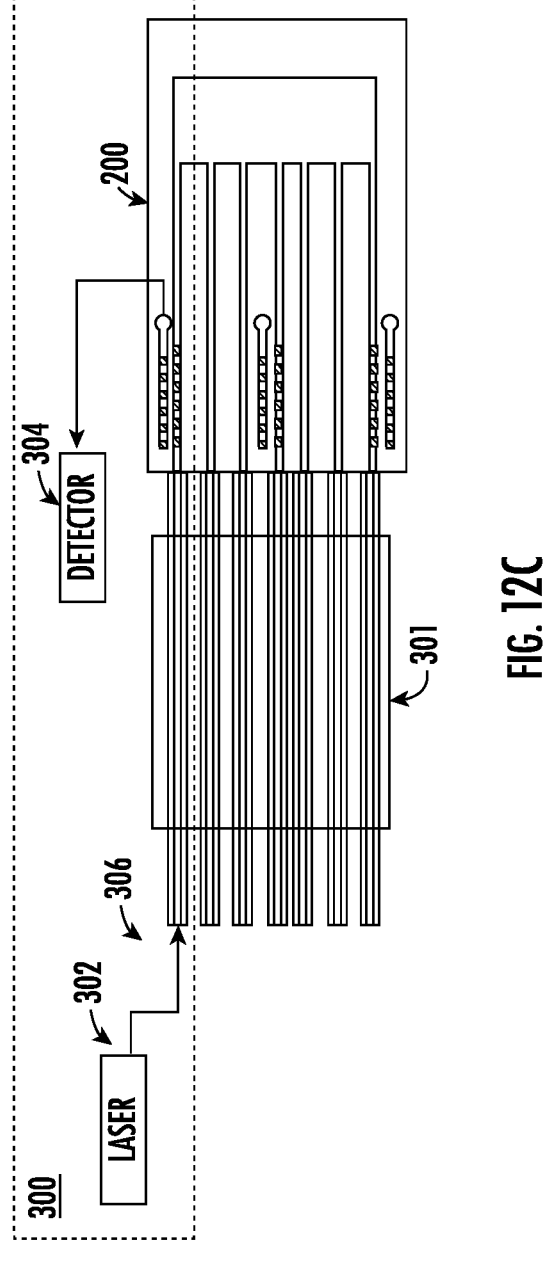

Thereafter, as shown in operation 408, the testing device 300 may determine the alignment of the one or more primary waveguides 204. As described above, the alignment or misalignment determination by the testing device 300 may be based upon the reflected optical signals having the second wavelength received by the testing device 300. With reference to FIGS. 12A-12C, the testing device 300 may include an optical transmitter (e.g., VCSEL, laser, light, etc.) configured to generate optical signals (e.g., light) at one or more wavelengths, an optical receiver 304 (e.g., photodiode (PD), detector, or the like) configured to receive optical signals at one or more wavelengths, and/or a circulator 306 configured to control the direction of the optical signals and/or combine/separate the optical signals. In FIG. 12A, the testing system 300 is illustrated connected with an FAU 301 and the optical module 200 such as described above with reference to FIG. 4. In such an embodiment, the laser 302 may generate an optical signal having the second wavelength that is supplied to the FAU 301, reflected by the signal reflection component 206 defined by the primary waveguide 204, and directed by the circulator 306 to the detector 304. In FIG. 12B, the testing system 300 is illustrated connected with an FAU 301 and the optical module 200 as described above with reference to FIG. 7A. In such an embodiment, the laser 302 may generate an optical signal having the second wavelength that is supplied to the FAU 301, directed by the component 206 from the primary waveguide 204 to the secondary waveguide 207 (e.g., forming a loopback) for receipt by the detector 304. In FIG. 12C, the testing system 300 is illustrated connected with an FAU 301 and the optical module 200 as described above with reference to FIG. 8C. In such an embodiment, the laser 302 may generate an optical signal having the second wavelength that is supplied to the FAU 301 and directed by the component 206 defined by the secondary waveguide 207 for coupling out of the optical module 200 for receipt by a detector 304.

In any of the embodiments described herein, the testing system 300 may operate to determine the alignment between the FAU 301 and the optical module 200 by analyzing the power of the optical signal received by the detector 304. The testing device 300, via a processor, a computer imaging/vision system, and/or the like, may attempt to maximize the power of the detected optical signals so as to determine if the one or more primary waveguides 204 are properly aligned for optically interfacing with the one or more optical fibers of the FAU 301. By way of example, the testing device 300 may monitor the optical signals that are returned to the detector 304 (e.g., via reflection, loopback, etc.) and modify the position of the optical module 200 with respect to the FAU 301 until the power of each of the returned optical signals is maximized. Although described herein with reference to a power of the reflected optical signals having the second wavelength, the present disclosure contemplates that any attribute, parameter, characteristic, etc. of the reflected optical signals may be analyzed by the testing device to the determine the alignment of the primary waveguides 204.

Example Method of Manufacturing

With reference to FIG. 10, an example method (e.g., method 500) of manufacturing an optical module is provided. At operation 502, the method may include providing a substrate. As described above, the substrate may be configured to support/define various optical components, such as in a PIC or PLC implementation. The substrate may, in some embodiments, comprise a dielectric material, a glass material, a polymer material, an amorphous material, a semiconductor material, and/or the like. The substrate may define a first end and a second end that may be, as shown, positioned opposite the first end. By way of example, the substrate may define a rectangular cross-sectional shape such that the first end is substantially parallel with respect to the second end. Although illustrated and described herein with reference to a first end and a second end that are positioned on opposing ends of a rectangular substrate, the present disclosure contemplates that the substrate may be dimensioned (e.g., sized and shaped) based upon the intended application of the optical module 200. Furthermore, the substrate 202 may define any number of ends located at any relative position or orientation based upon the intended application of the optical module 200.

Thereafter, as shown in operation 504, the method may include supporting one or more primary waveguides on the substrate. As described above, the primary waveguides may refer to the physical structure through which optical signals (e.g., light) may propagate. For example, the one or more primary waveguides may include optical fiber waveguides, transparent dielectric waveguides (e.g., formed of plastic and glass), liquid light guides, liquid waveguides, and/or the like through which optical signals may propagate based upon the intended application of the optical module. Furthermore, these primary waveguides may include any geometry (e.g., planar, strip, fiber, etc.), modal structure (e.g., single-mode, multi-mode, etc.), and/or refractive index distribution (e.g., step, gradient, etc.) based on the intended application of the optical module. In some embodiments, the one or more primary waveguides may be supported by the substrate (e.g., via a surface of the substrate). In other embodiments, the surface of the substrate may at least partially form the one or more primary waveguides, such as in instances in which the one or more primary waveguides are formed via optical lithography or the like.

As shown in operation 506, the method may include supporting an optoelectronic component on the substrate and in optical communication with the one or more primary waveguides. The optoelectronic component is configured for use with optical signals having a first wavelength. As described above, the optoelectronic component may refer to any device (or portion of a device) configured to detect and/or emit electromagnetic radiation, often in the form of light encoding underlying data. By way of example, the optoelectronic component may be an optical transmitter (e.g., vertical-cavity surface-emitting laser (VCSEL) or the like) configured to generate optical signals that are received by the one or more primary waveguides optically coupled thereto. These optical signals may, for example, be transmitted via the one or more primary waveguides to optical fibers coupled with the one or more primary waveguides and further transmitted by these optical fibers to corresponding optoelectronic components (e.g., optical receivers) optically coupled with another end of the optical fiber(s). By way of an additional example, the optoelectronic component may be an optical receiver (e.g., photodiode (PD) or the like) configured to receive optical signals that are transmitted by the one or more primary waveguides 204 optically coupled thereto. For example, one or more corresponding optoelectronic components (e.g., optical transmitters) optically coupled with another end of the optical fiber(s) may generate optical signals that are transmitted via the one or more optical fibers, supplied to the one or more primary waveguides, and further received by the optical receiver. (e.g., optoelectronic component). In some embodiments, the optoelectronic component 205 may be an optical transceiver configured to generate and receive optical signals. The present disclosure contemplates that the optoelectronic component may refer to any component, photonic circuit, device, or the like based upon the intended application of the optical module.

In some embodiments, as shown in operation 508, the method may include supporting one or more secondary waveguides on the substrate. As described above, the one or more secondary waveguides may be supported by the substrate (e.g., via a surface of the substrate) or may be at least partially formed by the substrate, such as in instances in which the one or more secondary waveguides are formed via optical lithography or the like. The one or more secondary waveguides may be positioned amongst the one or more primary waveguides so as to provide additional locations at which to determine the alignment of the one or more primary waveguides. Unlike waveguide loopbacks that are operationally required to be disposed along a peripheral edge of the optical module or device, the secondary waveguides may be centrally located on the substrate.

Thereafter, as shown in operation 510, the method may include providing a signal reflection component configured to selectively reflect optical signals having a second wavelength so as to determine an alignment of the one or more primary waveguides. As described above, the second wavelength may refer to a wavelength that is different from the first wavelength (e.g., the working wavelength or working spectral range at which optical signals that are conveying or encode data are transmitted). As would be evident given the optical signal transmissions used by the optical module, the second wavelength reflected by the signal reflection component may be selected so as to prevent interference with optical signals having the first wavelength. In some embodiments, the signal reflection component may be a Bragg grating configured to reflect optical signals having the second wavelength. For example, a reflection coefficient of the Bragg grating (e.g., signal reflection component) may be configured to reflect optical signals having the second wavelength. The example Bragg grating (e.g., signal reflection component) may refer to a periodic variation in the refractive index of the waveguides (e.g., primary waveguide(s) 204 or secondary waveguides 208 described hereafter), which generate a wavelength-specific dielectric mirror for reflecting optical signals (e.g., light) having the second wavelength. Although described herein with reference to a Bragg grating as an example signal reflection component, the present disclosure contemplates that any structure, feature, device, etc. may be used by the optical module to reflect optical signals (e.g., light) having the second wavelength. The signal reflection components may be defined by the one or more primary waveguides (e.g., FIG. 4) and/or the one or more secondary waveguides (e.g., FIG. 5, 6A, 6B, 7A, or 7B).

As described above, the present disclosure contemplates that the substrate may support, define, or otherwise be associated with these optoelectronic components without limitation. Said differently, the operations of FIG. 10 that refer to supporting optoelectronic components on the substrate may also refer operating that occur during formation of the substrate used for the optical modules described herein.

Many modifications and other embodiments of the present disclosure will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An optical module comprising:
   a substrate;
   one or more primary waveguides supported by the substrate, the one or more primary waveguides configured to transmit optical signals having a first wavelength;
   an optoelectronic component supported by the substrate and in optical communication with the one or more primary waveguides, wherein the optoelectronic component is configured for use with the optical signals having the first wavelength that are received from the one or more primary waveguides; and a signal reflection component configured to selectively reflect optical signals having a second wavelength back along a path in which the optical signals having the second wavelength were received so as to determine an alignment of the one or more primary waveguides.

2. The optical module according to claim 1, wherein the second wavelength is different than the first wavelength.

3. The optical module according to claim 1, wherein the one or more primary waveguides define the signal reflection component.

4. The optical module according to claim 3, wherein the one or more primary waveguides further comprise a plurality of primary waveguides each defining respective signal reflection components.

5. The optical module according to claim 1, further comprising one or more secondary waveguides supported by the substrate.

6. The optical module according to claim 5, wherein the one or more secondary waveguides define the signal reflection component.

7. The optical module according to claim 6, wherein at least one of the one or more primary waveguides is bounded on the substrate by a pair of secondary waveguides defining respective signal reflection components.

8. The optical module according to claim 1, wherein the one or more primary waveguides further comprise at least a first primary waveguide, the optical module further comprising:

a pair of secondary waveguides supported by the substrate on opposing sides of the first primary waveguide, wherein each of the pair of secondary waveguides define respective signal reflection components.

9. The optical module according to claim 1, wherein the signal reflection component comprises a Bragg grating.

10. The optical module according to claim 9, wherein a reflection coefficient of the Bragg grating is configured to reflect optical signals having the second wavelength.

11. The optical module according to claim 5, wherein the one or more secondary waveguides are disposed along a peripheral edge of the substrate so as to form a loopback, and the signal reflection component configured to selectively direct optical signals having a second wavelength into the one or more secondary waveguides forming the loopback.

12. An optical testing system comprising:

the optical module according to claim 3; and a testing device optically coupled with the one or more primary waveguides and configured to:

provide the optical signals having the second wavelength to the one or more primary waveguides; and determine the alignment of the one or more primary waveguides based upon a reflection of the optical signals having the second wavelength.

13. An optical testing system comprising:

the optical module according to claim 5; and a testing device optically coupled with the one or more secondary waveguides and configured to:

provide the optical signals having the second wavelength to the one or more secondary waveguides; and determine the alignment of the one or more primary waveguides based upon a reflection of the optical signals having the second wavelength.

14. A method of manufacturing an optical module, the method comprising:

providing a substrate;

supporting one or more primary waveguides on the substrate, the one or more primary waveguides configured to transmit optical signals having a first wavelength;

supporting an optoelectronic component on the substrate and in optical communication with the one or more primary waveguides, wherein the optoelectronic component is configured for use with the optical signals having the first wavelength that are received from the one or more primary waveguides; and providing a signal reflection component configured to selectively reflect optical signals having a second wavelength back along a path in which the optical signals having the second wavelength were received so as to determine an alignment of the one or more primary waveguides.

15. The method according to claim 14, wherein the second wavelength is different than the first wavelength.

16. The method according to claim 14, wherein the one or more primary waveguides define the signal reflection component.

17. The method according to claim 14, further comprising supporting one or more secondary waveguides on the substrate.

18. The method according to claim 17, wherein the one or more secondary waveguides define the signal reflection component.

19. The method according to claim 18, wherein at least one of the one or more primary waveguides are bounded on the substrate by a pair of secondary waveguides defining respective signal reflection components.

20. The method according to claim 14, wherein the one or more primary waveguides further comprise at least a first primary waveguide, the method further comprising:

supporting a pair of secondary waveguides on the substrate on opposing sides of the first primary waveguide, wherein each of the pair of secondary waveguides define respective signal reflection components.

* * * * *